(12) United States Patent
Zelenka

(10) Patent No.: US 7,007,024 B2
(45) Date of Patent: Feb. 28, 2006

(54) HASHING OBJECTS INTO MULTIPLE DIRECTORIES FOR BETTER CONCURRENCY AND MANAGEABILITY

(75) Inventor: James D. Zelenka, Pittsburgh, PA (US)

(73) Assignee: Panasas, Inc., Pittsburgh, PA (US)

( * ) Notice: Subject to any disclaimer, the term of this patent is extended or adjusted under 35 U.S.C. 154(b) by 466 days.

(21) Appl. No.: 10/274,243

(22) Filed: Oct. 18, 2002

(65) Prior Publication Data
US 2003/0187866 A1     Oct. 2, 2003

Related U.S. Application Data

(60) Provisional application No. 60/372,044, filed on Apr. 12, 2002, provisional application No. 60/368,796, filed on Mar. 29, 2002.

(51) Int. Cl.
*G06F 17/30* (2006.01)
(52) U.S. Cl. .......................................... 707/8; 707/102
(58) Field of Classification Search .................. 707/8, 707/102
See application file for complete search history.

(56) References Cited

U.S. PATENT DOCUMENTS

| | | | | |
|---|---|---|---|---|
| 4,601,012 A | * | 7/1986 | Aiken, Jr. ............................. 714/15 |
| 5,303,379 A | | 4/1994 | Khoyi et al. ....................... 395/700 |
| 5,347,632 A | * | 9/1994 | Filepp et al. ....................... 709/202 |
| 5,394,554 A | * | 2/1995 | Elko et al. ......................... 709/224 |
| 5,542,078 A | * | 7/1996 | Martel et al. ...................... 707/101 |
| 5,581,760 A | | 12/1996 | Atkinson et al. .................. 395/700 |
| 5,634,124 A | | 5/1997 | Khoyi et al. ....................... 395/614 |
| 5,659,746 A | * | 8/1997 | Bankert et al. .................... 707/205 |
| 5,798,763 A | | 8/1998 | Larson et al. ...................... 345/423 |
| 5,802,524 A | | 9/1998 | Flowers et al. .................... 707/103 |
| 5,878,434 A | * | 3/1999 | Draper et al. ..................... 707/202 |
| 5,946,686 A | | 8/1999 | Schmuck et al. .................. 707/10 |
| 5,956,734 A | | 9/1999 | Schmuck et al. ................. 707/205 |
| 5,960,446 A | | 9/1999 | Schmuck et al. ................. 707/205 |
| 5,987,477 A | | 11/1999 | Schmuck et al. ................. 707/201 |
| 6,023,706 A | | 2/2000 | Schmuck et al. ................. 707/200 |
| 6,154,746 A | * | 11/2000 | Berchtold et al. ................. 707/100 |
| 6,175,835 B1 | * | 1/2001 | Shadmon ........................... 707/102 |

(Continued)

OTHER PUBLICATIONS

Article by Garth A. Gibson et al. entitled "A Cost-Effective, High-Bandwidth Storage Architecture", pp. 92-103, Association for Computing Machinery, 1998.

(Continued)

*Primary Examiner*—Wayne Amsbury
(74) *Attorney, Agent, or Firm*—Morgan Lewis & Bockius LLP

(57) ABSTRACT

A data storage methodology wherein a hashing algorithm is applied to break a directory object experiencing frequent concurrent accesses from a number of client or manager applications into a predetermined number of hash component objects and a hash master object that manages the component objects. The hash master object and the hash components, together, constitute a hash directory, which replaces the original non-hashed directory object. Each hash component object contains a portion of the entries contained in the original directory object. Each hash component is managed by only one file manager. The entries in the original directory object are distributed among the hash component objects using a predefined hashing algorithm. The creation of hash components and the hash master allows more than one client application or file manager to concurrently write corresponding hash components without the need for access coordination on each access.

12 Claims, 3 Drawing Sheets

U.S. PATENT DOCUMENTS

| | | | |
|---|---|---|---|
| 6,374,232 B1 * | 4/2002 | Dageville et al. | 707/2 |
| 6,604,068 B1 * | 8/2003 | Bukowski et al. | 703/22 |
| 6,708,186 B1 * | 3/2004 | Claborn et al. | 707/102 |
| 6,725,392 B1 * | 4/2004 | Frey et al. | 714/6 |
| 6,754,656 B1 * | 6/2004 | Cornwell et al. | 707/8 |
| 6,795,817 B1 * | 9/2004 | Agarwal et al. | 707/2 |
| 6,941,510 B1 * | 9/2005 | Ozzie et al. | 715/513 |
| 2002/0091702 A1 * | 7/2002 | Mullins | 707/100 |

OTHER PUBLICATIONS

Article by Garth A. Gibson and Rodney Van Meter entitled "Network Attached Storage Architecture", pp. 37-45, Communications of the ACM, Nov. 2000, vol. 43, No. 11.

Article by Andreas Dilger & Peter J. Braam entitled "Object Based Storage HOWTO", pp. 1-13, Version 2, Dec. 23, 1999, available at http://www.lustre.org/docs.

* cited by examiner

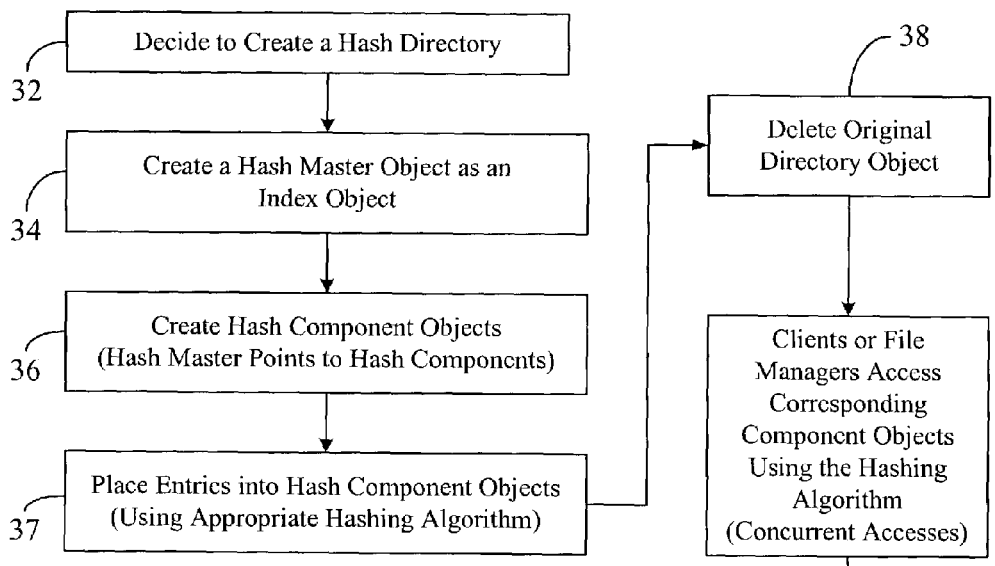

HASHING OBJECTS INTO MULTIPLE DIRECTORIES FOR BETTER CONCURRENCY AND MANAGEABILITY

REFERENCE TO RELATED APPLICATIONS

This application claims priority benefit of prior filed co-pending U.S. provisional application Ser. No. 60/372,044, filed on Apr. 12, 2002, the disclosure of which is incorporated herein by reference in its entirety.

This application also relates to the prior filed co-pending U.S. provisional patent application Ser. No. 60/368,796, filed on Mar. 29, 2002, the disclosure of which is incorporated herein by reference in its entirety.

BACKGROUND

1. Field of the Invention

The present invention generally relates to data storage systems and methods, and, more particularly, to a methodology for hashing objects into multiple directories in a distributed object-based data storage system to allow better information access concurrency.

2. Description of Related Art

With increasing reliance on electronic means of data communication, different models to efficiently and economically store a large amount of data have been proposed. A data storage mechanism requires not only a sufficient amount of physical disk space to store data, but various levels of fault tolerance or redundancy (depending on how critical the data is) to preserve data integrity in the event of one or more disk failures. In addition to providing fault tolerance, a data storage system also requires reduction in access latency and contention (thereby expediting access) when two or more applications attempt to concurrently access the same storage location for data retrieval.

In an object-based data storage system, many client applications or workloads include metadata operations on one or a small number of directory objects with very high concurrency. Metadata may include file and directory object attributes as well as directory object contents. The term "metadata" generally refers not to the underlying data itself, but to the attributes or information that describe that data. In a large cluster of computing machines or on a massively parallel machine, having every node create or access a file object in a single directory simultaneously for metadata operations (e.g., creating a checkpoint file) implies N concurrent operations in a single directory, where N is the number of nodes or computing machines in the storage system. In this situation, the requested operations are essentially serialized, because each operation is logically independent of the other ones and each operation must lock the parent directory object for the duration of the operation to successfully complete the operation. Thus, even in a distributed data storage architecture, the file manager controlling the directory object experiencing concurrent accesses becomes a hotspot because this file manager is the single point of contention for all the parallel operations.

The serialization problem discussed above is still present even when there are multiple file managers in a distributed storage system. The multiple file managers may be configured to share responsibility for a single directory. This situation is not conceptually different from the single file manager scenario discussed in the previous paragraph. The only difference is that a create request (e.g., to create a file) may now be routed to any one of a set of file managers, rather than just a single file manager. From the file system perspective, the file managers sharing responsibility for this directory must coordinate their activities with one another. Furthermore, updates to the directory object must still be serialized among the managing group of file managers. This multiple file manager situation greatly complicates the file manager's fault model and the overhead of synchronizing updates among the file managers may greatly overwhelm any potential benefit from this scheme.

Therefore, it is desirable to devise a data storage methodology that allows for increased concurrency among information transfer operations on a single directory object. It is further desirable that the data storage methodology alleviate the problem of access serialization, while reducing data access latency and contention.

SUMMARY

In one embodiment, the present invention contemplates a method of providing increased concurrency among information transfer operations performed by one or more of a plurality of executable applications operating in an object-based data storage system. The method comprises forming an index object that points to a plurality of component objects, wherein the index object is concurrently accessed by one or more of the plurality of executable applications, and wherein each component object contains a portion of information managed by the index object; using a mapping function to determine which of the plurality of component objects is to be accessed by a corresponding one of the plurality of executable applications; and configuring each of the plurality of executable applications to access only that component object which is determined using the mapping function for respective information transfer operations.

The index object is called the hash master and the component objects are called the hash components. The hash master points to each hash component and maintains a list of file managers, where each file manager in the list is responsible for managing only one hash component. The hash master and its corresponding hash components constitute a hash directory object. The entries or information contained in the original, non-hashed directory object is distributed among the hash components using a predefined hashing algorithm of mapping function.

A client application or a file manager wishing to access an object indexed in the hash directory may first use the hashing algorithm or the mapping function to determine the location of that object in the hash directory, i.e., the identity of the hash component where the object is stored. The client application or the file manager can then access only that hash component, if authorized to do so, without interfering with accesses by other applications or file managers to the same hash directory object. The creation of hash components and the hash master thus allows more than one client application or file manager to concurrently access corresponding hash components for information transfer operations on objects stored therein without creating access contentions. Thus, the prior art problems of access serialization and reduced data access manageability are substantially alleviated.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 3 shows a three-level storage configuration for objects stored in the object-based data storage system in FIG. 1;

FIG. 4 is an exemplary representation of how objects in a file directory are organized prior to hashing according to the present invention;

FIG. 5 depicts an exemplary flow chart of the hashing methodology according to the present invention.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Figure 1:
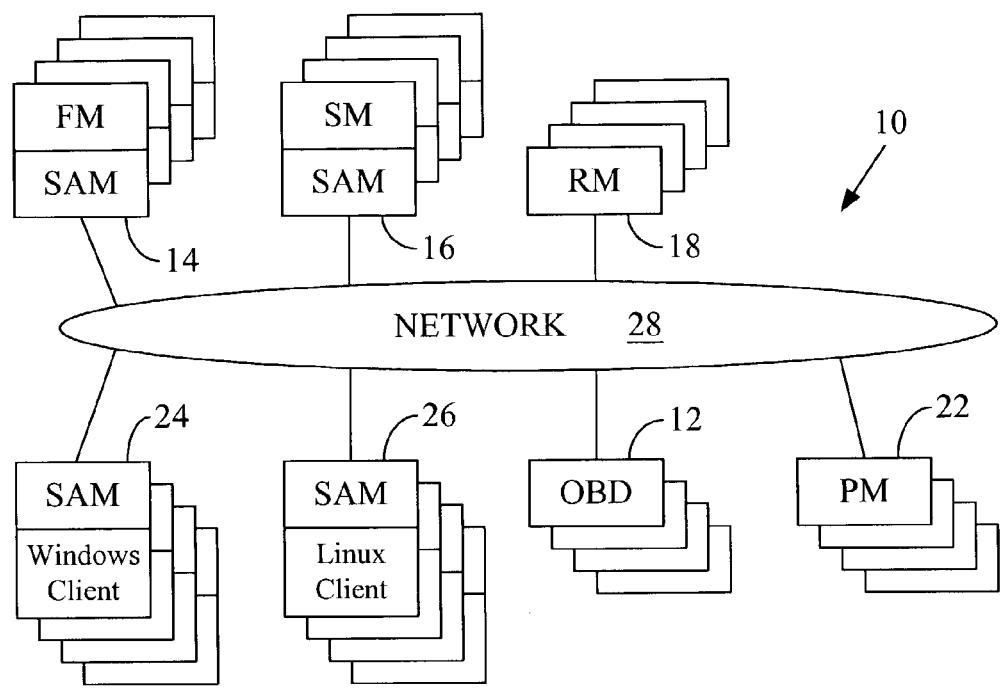
FIG. 1 illustrates an exemplary network-based file storage system designed around Object Based Secure Disks (OBSDs or OBDs)

FIG. 1 illustrates an exemplary network-based file storage system 10 designed around Object Based Secure Disks (OBSDs or OBDs) 12. The file storage system 10 is implemented via a combination of hardware and software units and generally consists of managers 14, 16, 18, and 22, OBDs 12, and clients 24, 26. It is noted that FIG. 1 illustrates multiple clients, OBDs, and managers—i.e., the network entities—operating in the network environment. However, for the ease of discussion, a single reference numeral is used to refer to such entity either individually or collectively depending on the context of reference. For example, the reference numeral "12" is used to refer to just one OBD or a group of OBDs depending on the context of discussion. Similarly, the reference numerals 14–22 for various managers are used interchangeably to also refer to respective servers for those managers. For example, the reference numeral "14" is used to interchangeably refer to the software file managers (FM) and also to their respective servers depending on the context. It is noted that each manager is an application program code or software running on a corresponding server. The server functionality may be implemented with a combination of hardware and operating software. For example, each server in FIG. 1 may be a Windows NT® server. Thus, the file system 10 in FIG. 1 is an object-based distributed data storage system implemented in a client-server configuration.

The network 28 may be a LAN (Local Area Network), WAN (Wide Area Network), MAN (Metropolitan Area Network), SAN (Storage Area Network), wireless LAN, or any other suitable data communication network including a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the system 10. FIG. 1 illustrates a group of clients or client computers 24 running on Microsoft Windows® operating system, whereas another group of clients 26 are running on the Linux® operating system. The clients 24, 26 thus present an operating system-integrated file system interface. The semantics of the host operating system (e.g., Windows®, Linux®, etc.) may preferably be maintained by the file system clients.

The manager (or server) and client portions of the program code may be written in C, C++, or in any other compiled or interpreted language suitably selected. The client and manager software modules may be designed using standard software tools including, for example, compilers, linkers, assemblers, loaders, bug tracking systems, memory debugging systems, etc.

FIG. 1 shows a number of OBDs 12 attached to the network 28. An OBSD or OBD 12 is a physical disk drive that stores data files in the network-based system 10 and may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the OBDs 12 may be considered as first-class network citizens); and (3) it enforces a security model to prevent unauthorized access to data stored thereon.

The fundamental abstraction exported by an OBD 12 is that of an "object," which may be defined as a variably-sized ordered collection of bits. Contrary to the prior art block-based storage disks, OBDs do not export a sector interface (which guides the storage disk head to read or write a particular sector on the disk) at all during normal operation. Objects on an OBD can be created, removed, written, read, appended to, etc. OBDs do not make any information about particular disk geometry visible, and implement all layout optimizations internally, utilizing lower-level information than can be provided through an OBD's direct interface with the network 28. In one embodiment, each data file and each file directory in the file system 10 are stored using one or more OBD objects.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

On the other hand, in the system 10 illustrated in FIG. 1, each OBD 12 communicates directly with clients 24, 26 on the network 28, possibly through routers and/or bridges. The OBDs, clients, managers, etc., may be considered as "nodes" on the network 28. In system 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and OBDs, but the servers do not normally implement such transfers.

In one embodiment, the OBDs 12 themselves support a security model that allows for privacy (i.e., assurance that data cannot be eavesdropped while in flight between a client and an OBD), authenticity (i.e., assurance of the identity of the sender of a command), and integrity (i.e., assurance that in-flight data cannot be tampered with). This security model may be capability-based. A manager grants a client the right to access the data storage (in one or more OBDs) by issuing to it a "capability." Thus, a capability is a token that can be granted to a client by a manager and then presented to an OBD to authorize service. Clients may not create their own capabilities (this can be assured by using known cryptographic techniques), but rather receive them from managers and pass them along to the OBDs. In one embodiment, a manager (e.g., a file manager 14) may also contact another manager (e.g., another file manager) for a capability for some specialized operations as discussed later hereinbelow.

A capability is simply a description of allowed operations. A capability may be a set of bits (1's and 0's) placed in a predetermined order. The bit configuration for a capability may specify the operations for which that capability is valid. Thus, there may be a "read capability," a "write capability," etc. Every command sent to an OBD may need to be accompanied by a valid capability of the appropriate type. A manager may produce a capability and then digitally sign it using a cryptographic key that is known to both the manager and the appropriate OBD, but unknown to the client. The client will submit the capability with its command to the OBD, which can then verify the signature using its copy of the key, and thereby confirm that the capability came from an authorized manager (one who knows the key) and that it has not been tampered with in flight. An OBD may itself use cryptographic techniques to confirm the validity of a capability and reject all commands that fail security checks. Thus, capabilities may be cryptographically "sealed" using "keys" known only to one or more of the managers 14–22 and the OBDs 12.

Logically speaking, various system "agents" (i.e., the clients 24, 26, the managers 14–22 and the OBDs 12) are independently-operating network entities. Day-to-day services related to individual files and directories are provided by file managers (FM) 14. The file manager 14 is responsible for all file- and directory-specific states. The file manager 14 creates, deletes and sets attributes on entities (i.e., files or directories) on clients' behalf. When clients want to access other entities on the network 28, the file manager performs the semantic portion of the security work—i.e., authenticating the requester and authorizing the access—and issuing capabilities to the clients. File managers 14 may be configured singly (i.e., having a single point of failure) or in failover configurations (e.g., machine B tracking machine A's state and if machine A fails, then taking over the administration of machine A's responsibilities until machine A is restored to service).

The primary responsibility of a storage manager (SM) 16 is the aggregation of OBDs for performance and fault tolerance. A system administrator (e.g., a human operator or software) may choose any layout or aggregation scheme for a particular object. The SM 16 may also serve capabilities allowing clients to perform their own I/O to aggregate objects (which allows a direct flow of data between an OBD and a client). The storage manager 16 may also determine exactly how each object will be laid out—i.e., on what OBD or OBDs that object will be stored, whether the object will be mirrored, striped, parity-protected, etc. This distinguishes a "virtual object" from a "physical object". One virtual object (e.g., a file or a directory object) may be spanned over, for example, three physical objects (i.e., OBDs).

The storage access module (SAM) is a program code module that may be compiled into the managers as well as the clients. The SAM generates and sequences the OBD-level operations necessary to implement system-level I/O operations, for both simple and aggregate objects. The installation of the manager and client software to interact with OBDs 12 and perform object-based data storage in the file system 10 may be called a "realm." The realm may vary in size, and the managers and client software may be designed to scale to the desired installation size (large or small). A realm manager 18 is responsible for all realm-global states. That is, all states that are global to a realm state are tracked by realm managers 18. In one embodiment, the program codes for managers can communicate with one another whenever needed.

A performance manager 22 may run on a server that is separate from the servers for other managers (as shown, for example, in FIG. 1) and may be responsible for monitoring the performance of the file system realm and for tuning the locations of objects in the system to improve performance. The performance manager 22 can be directly manipulated through command-line tools, allowing the system administrator to manually reconfigure the realm.

A further discussion of various managers shown in FIG. 1 and the interaction among them is provided on pages 11–15 in the co-pending, commonly-owned U.S. patent application Ser. No. 10/109,998, filed on Mar. 29, 2002, titled "Data File Migration from a Mirrored RAID to a Non-Mirrored XOR-Based RAID Without Rewriting the Data", whose disclosure at pages 11–15 is incorporated by reference herein in its entirety.

A benefit of the present system is that the location information describing at what data storage device (i.e., an OBD) or devices 12 the desired data is stored may be located at a plurality of processors (or managers) in the network. Therefore, a client 24, 26 need only identify one of a plurality of manager processors containing access information for the desired data to be able to access that data. The data is then returned to the client directly from the data storage device without passing through a manager.

Generally, the clients may directly read and write data, and may also directly read metadata. The managers, on the other hand, may directly read and write metadata. Metadata may include file and directory object attributes as well as directory object contents. Thus, broadly speaking, "metadata" refers not to the underlying data itself, but to the attributes or information that describe that data. The managers may create other objects in which they can store additional metadata, but these manager-created objects may not be exposed directly to clients.

The fact that clients directly access OBDs, rather than going through a server, makes I/O operations in the object-based file systems 10 different from other file systems. In one embodiment, prior to accessing any data or metadata, a client must obtain (1) the identity of the OBD on which the data resides and the object number within that OBD, and (2) a capability valid on that OBD allowing the access. Clients learn of the location of objects by directly reading and parsing directory objects located on the OBD(s) identified. Clients obtain capabilities by sending explicit requests to file managers 14. The client includes with each such request its authentication information as provided by the local authentication system. The file manager 14 may perform a number of checks (e.g., whether the client is permitted to access the OBD, whether the client has previously misbehaved or "abused" the system, etc.) prior to granting capabilities. If the checks are successful, the FM 14 may grant requested capabilities to the client, which can then directly access the OBD in question or a portion thereof.

Figure 2:
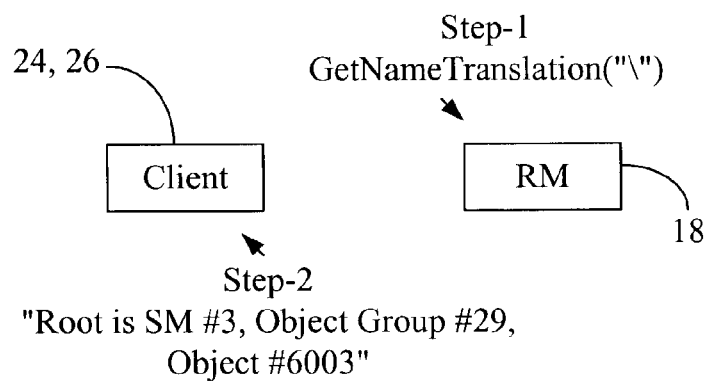
FIG. 2 is a simplified diagram of the process when a client first establishes a contact with the data file storage system in FIG. 1.

FIG. 2 is a simplified diagram of the process when a client 24, 26 first establishes a contact with the data file storage system 10 according to the present invention. At client setup time (i.e., when a client is first connected to the network 28), a utility (or discovery) program may be used to configure the client with the address of at least one realm manager 18 associated with that client. The configuration software or utility program may use default software installation utilities for a given operating system (e.g., the Windows® installers, Linux® RPM files, etc.). A client wishing to access the file storage system 10 for the first time may send a message to the realm manager 18 (whose address is provided to the client) requesting the location of the root directory of the client's realm. A "Get Name Translation" command may be used by the client to request and obtain this information as shown by step-1 in FIG. 2. The contacted RM may send the requested root directory information to the client as given under step-2 in FIG. 2. In the example shown in FIG. 2, the root information identifies the triplet {device_ID, object-group_ID, object_ID}, which is {SM #3, object-group #29, object #6003}. The client may then contact the FM identified in the information received from the RM (as part of that RM's response for the request for root directory information) to begin resolving path names. The client may probably also acquire more information (e.g., the addresses of all realm managers, etc.) before it begins accessing files to/from OBDs.

After the client establishes the initial contact with the file storage system 10—i.e., after the client is "recognized" by the system 10—the client may initiate information transfer operations to one or more OBDs 12. The phrase "information transfer operations," as used herein, refers, for example, not only to operations related to data read/write, but also to operations involving metadata or system control.

In the system 10 in FIG. 1, the storage configuration may be organized in three levels as illustrated in FIG. 3. Each higher level may be considered as a "container" for the next lower one. Thus, a device (e.g., a storage manager 16 or an OBD 12) may contain one or more object groups, with each object group containing one or more objects, as illustrated in FIG. 3. However, it is noted that some devices may not contain any object group. Every object stored on an OBD may have an associated set of attributes. Some of the major attributes for an object include: (1) a device_ID identifying, for example, the OBD storing that object and the file and storage managers managing that object; (2) an object-group_ID identifying the object group containing the object in question; and (3) an object_ID containing a number randomly generated (e.g., by a storage manager) to identify the object in question. It is noted that, in one embodiment, each {device_ID, object-group_ID, object_ID} triplet must be unique in the realm. In other words, even if two objects have the same object_ID, they cannot have the same values for the corresponding {device_ID, object-group_ID, object_ID} triplets.

FIG. 4 is an exemplary representation of how objects in a file directory 30 are organized prior to hashing according to the present invention. Each directory object (including the root) on an OBD may contain a section for header information and another section for entries 31. The entries 31 for the directory 30 may include a field for names (of objects contained in the directory 30) and a field for corresponding identifiers. An identifier may include the values for the entire {device_ID, object-group_ID, object_ID} triplet for the corresponding object whose name appears in the "name" field. As shown in FIG. 4, some of the file objects in the directory 30 have names "a.txt," "d.bmp," "c.doc", etc. FIG. 4 also shows some exemplary values for identifiers for these names. These names and corresponding identifiers are for illustration purpose only. The directory 30 may contain many more file and sub-directory objects not shown or discussed herein.

It is observed that many client workloads involve operations (e.g., by file managers 14) on metadata (e.g., the object attributes or unique ID's) contained in the directory object 30. For example, a metadata operation is performed every time a new file is created in the directory 30 or a file is removed from the directory 30. When there are a large number of files or sub-directories in the directory object 30, the serialization problem (discussed hereinabove in the Background section) may occur when a number of client or manager applications attempt to perform metadata operations or any other information transfer operations concurrently. For example, in a large cluster of nodes or on a massively parallel machine, having every node create a checkpoint file (for system data consistency and fault tolerance) simultaneously in a single directory (e.g., the directory 30) implies N concurrent operations on a single directory, where N can be the number of nodes in the system (e.g., the system 10 in FIG. 1). The value of N in some systems may be in the 100's or even in the 1000's. As another example, two or more client applications 24, 26 may simultaneously attempt to create new entries into the directory object 30 also.

In this situation of N concurrent operations on the file directory object 30, the operations are essentially serialized because each operation is logically independent and each must lock the parent directory object for the duration of the operation. Thus, despite the distributed architecture in FIG. 1, the file manager controlling/managing the directory object 30 becomes a hotspot because it is the single point of contention for all of these N parallel operations requesting simultaneous access to the directory object 30.

FIG. 5 depicts an exemplary flow chart of the hashing methodology according to the present invention. The hashing methodology of the present invention alleviates the problem of directory resource contention among a large number of concurrent information transfer operations by identifying those directory or directories that experience a large number of concurrent information transfer operations performed thereon. Such directory or directories are converted into "hash directories" (block 32, FIG. 5), which are described in more detail hereinbelow. In one embodiment, a client application 24, 26 is allowed to inform its corresponding file manager 14 which directory object the client wishes to convert into a hash directory. The file manager 14 may then contact a corresponding performance manager 22 to convert the regular directory object into a hash directory object. A hash directory may be created when the corresponding non-hash directory 30 is empty (e.g., when the normal directory 30 is first created in the system 10). Here, at the time of directory creation, instead of creating the regular directory 30, the respective file manager 14 may simply create the hash directory itself and manage the entries within that hash directory in the manner described hereinbelow with reference to FIG. 6. Alternatively, an existing directory, with all its content, may be converted by a performance manager 22 into a hash directory during run time.

Other approaches in creating a hash directory may include: (1) an automatic conversion (e.g., by a performance manager 22) of the regular directory 30 into its corresponding hash directory when the size of the regular directory reaches a predetermined value (e.g., 100 MB) because too large a file may experience increased frequency of concurrent information transfer operations thereon, or (2) an automatic conversion (e.g., by a performance manager 22) of the regular directory 30 into its corresponding hash directory when the number of information transfer operations concurrently pending thereon exceeds a predetermined value (=X). In this case, the performance manager 22 responsible for the directory object 30 may track/monitor the length of the queue of pending operations (who have been serialized because of their concurrency) for a given time period and may decide to convert the directory object 30 into a hash directory when the length of the queue over the monitoring time period frequently attains or exceeds the predetermined value X.

Figure 6:
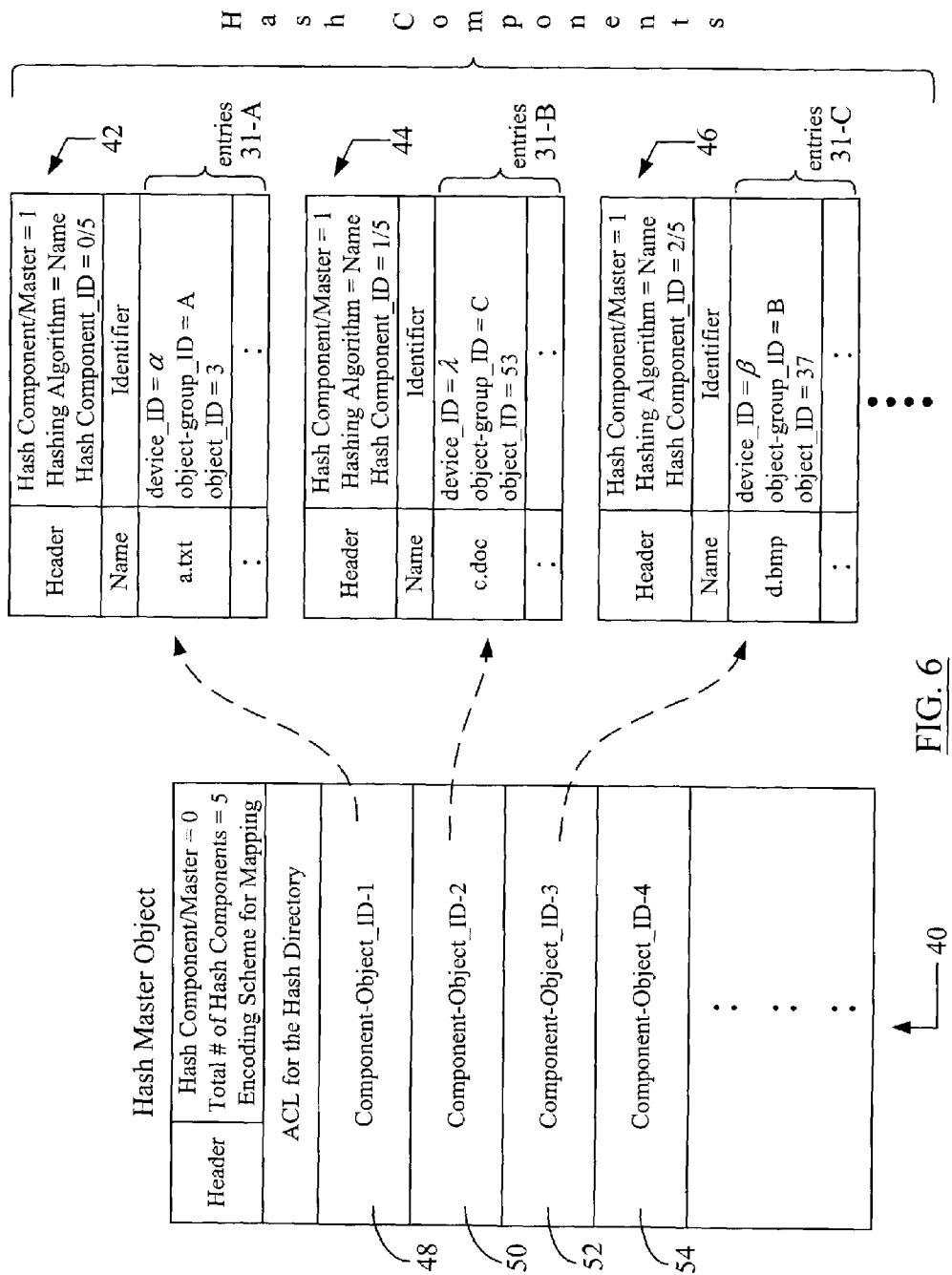
FIG. 6 illustrates a hash master object and some of its hash component objects created by hashing the directory object shown in FIG. 4 using the hashing methodology according to the present invention.

FIG. 6 illustrates a hash master object 40 and some of its hash component objects 42, 44, 46 created by hashing the directory object 30 shown in FIG. 4 using the hashing methodology according to the present invention. A hash directory thus includes a hash master object and a number of hash components depending on the content of the regular, non-hash directory. The number of hash components may be randomly selected. For example, in one embodiment, when a non-hash directory contains more than 20,000 entries, the corresponding hash directory contains 50 component objects. Generally, the number of hash components necessary for a non-hash directory object may be determined based on what component size provides efficient or optimum access concurrency in the system. In a hash directory, the single directory object (here, the single directory object 30) containing the mappings of all names of files and subdirectories to corresponding objects is replaced with: (1) a single object (i.e., the hash master object 40) containing a list of other directory objects; and (2) a number of directory objects (i.e., hash components 42–46) who are managed through the list in the hash master object 40. Thus, the hash master object 40 is created as an index object (block 34, FIG. 5) that points to each of its child objects, called the hash component objects 42–46 (block 36, FIG. 5). It is noted that only three hash components 42–46 are shown and discussed herein for the sake of simplicity and ease of discussion. In practice, there may be many more such hash components 42–46 created for the hash directory. Therefore, although the discussion hereinbelow focuses on the hash components 42–46, it is understood that the numerals 42–46 also refer to and include other hash components not shown in FIG. 6.

In one embodiment, the hash master 40 is "entered" or stored in the parent of the directory object 30. Unlike ordinary directory objects (e.g., the directory object 30), the hash master object 40 does not contain entries for its child files and directories. Such entries are stored in the corresponding hash components 42–46 as shown in FIG. 6 and discussed below. In other words, the logical contents of the original directory 30 are distributed or divided among each of the hash components 42–46. Each hash component 42–46 has a format similar to the ordinary (non-hashed) directory object 30. Thus, the entries in the original directory 30 are stored among the hash components 42–46 in a non-overlapping manner. In other words, the logical content of the original directory 30 is the union of the entries in all of its member objects (i.e., the hash components 42–46).

In one embodiment, as depicted in FIG. 6, the hash master object 40 may include the following three information fields along with its routine header information: (1) The total number of hash components managed by the hash master. (2) The ACL (Access Control List) for the hash directory created in place of the ordinary directory 30. The ACL for the hash directory may specify which principals (i.e., managers, clients, users, etc.) have access to the hash directory contents. Each hash component 42–46 is managed by only one file manager having access to the hash directory contents. (3) An indication of the encoding scheme that is to be used to determine the mapping to a particular hash component in the hash directory. In one embodiment, a Unicode encoding of the object name may be specified as an input for the mapping function. The Unicode encoding scheme is an international character-encoding system designed to support the electronic interchange, processing, and display of the written texts in diverse languages. In Unicode, the unique number provided for each character or symbol in a language remains the same on any system that supports Unicode. In one embodiment, the Unicode encoding is used to represent the name of an object (e.g., a file object or a directory object) in a given language (e.g., English).

FIG. 6 also shows some of the entries 48–54 in the hash master object 40. There may be many more such entries in the hash master 40 as indicated by a dotted line. Each entry in the hash master 40 identifies a component-object_ID of a corresponding hash component object. For example, as shown in FIG. 6, the entry 48 indicates that the component-object_ID-1 is the identity of the hash component 42, the entry 50 indicates that the component-object_ID-2 is the identity of the hash component 44, and so on. Thus, according to the present invention, there is a one-to-one correspondence between a hash component and an entry in the hash master 40. It is noted that a hash component is not managed by more than one file manager. However, the same file manager may manage more than one hash component. The work of managing the entries (i.e., the entries 31 in FIG. 4) in a hash directory with N component objects may be balanced across up to N file managers, each of which may act independently of the others (i.e., each file manager may manage the information transfer operations on a corresponding component object without coordination with other file managers on each information access operation), thereby allowing increased concurrency for information transfer operations involving the entries 31 in the hash directory. The breaking-up of the entries 31 in the original directory object and independent management of the broken-up groups substantially alleviates the serialization problem for concurrent accesses.

The entries 31 in the original directory object 30 are distributed or placed among a predetermined number of hash components 42–46 using an appropriate mapping function or hashing algorithm (block 37, FIG. 5). In one embodiment, the mapping function or hashing algorithm is applied to the entry's or object's entire name (using, for example, ASCII or Unicode values of alpha-numeric characters in the object's name) and yields an integer. The modulus of that integer over the number of hash components in the hash master determines to which hash component that entry is assigned or belongs. The same mapping function may be used to determine which component object is appropriate to place a new entry just created in the hash directory. The component objects may be numbered by entry order in the master object 40, with the first component assigned the number zero (0). In this situation, the master object 40 differs from the ordinary directory object 30 in that the ordering of directory entries matters in the case of the master object.

Referring to the embodiment in FIG. 6, the application of the hashing algorithm described above results in the "a.txt" entry (including its corresponding identifier values) and some other entries (not shown) being placed in the component object 42, which is the first component object (with component number=0). Similarly, the "c.doc" entry is placed in the second component object 44, and the "d.bmp" entry is placed in the third component object 46. As can be seen from FIG. 6, there may be many more entries in each component object, and there may be many more component objects than the three 42–46 shown in FIG. 6. Thus, as indicated in FIG. 6, the entire set of entries 31 in the original directory object 30 is divided among the hash components with each component containing its corresponding set of entries. For example, the portion of the original entries 31 contained in the component 42 is indicated by designation "31-A", the group of entries in the second component object 44 is indicated by designation "31-B", and so on. This shows the correspondence between the original set of entries 31 and its divisions 31-A, 31-B, 31-C, and so on. It is noted, however, that the size of the groups 31-A, 31-B, 31-C, etc., may not be the same. In other words, for example, if there are 100 objects in the original directory 30, the number of entries in the components 42, 44, 46 may be 10, 15, and 25 respectively, with the remaining 50 entries being divided among other components (not shown in FIG. 6). It is further noted that the mapping function is applied to a unique portion of the file path name of a file or object. For example, in case of a file whose path is given as "/a/b/c.doc", the mapping function may be applied to directory object "b" if it is determined to convert "a" into a hash directory. Similarly, if it is determined to convert "b" into a hash directory, then the mapping function may be applied to the file object "c.doc." Also, if it is decided to convert both "a" and "b" into hash directories, then the mapping function may be applied to "b" and "c.doc", one at a time. Thus, the mapping function is applied to the next object in the file path following the directory to be hashed.

As shown in FIG. 6, each component object 42–46 contains, along with its header, the information about whether that object is a hash component or the hash master, the name or identifying information about the hashing algorithm used to distribute the entries in the original directory 30, and the component_ID of that hash component. The type of the object (such as, for example, a file object, a directory object, a hash master object, a hash component object, etc.) may be indicated in the object attributes using appropriate numerical ("0", "1", etc.) designation. In one embodiment, the component_ID for a hash component is represented in the format "m/n" where "m" is the entry order of that component in the hash master object 40 (with the first component having the value of m=0, the second component having the value of m=1, and so on) and "n" represents the total number of hash components in the hash directory (the embodiment in FIG. 6 has five hash components). Comparing the structures of the original directory object 30 and each hash component 42–46, it is evident that the structure and organization of each hash component 42–46 is substantially identical to that of the original directory object 30.

It is noted that any suitable hashing algorithm or mapping function can be used to distribute the contents of the original directory object 30 into its corresponding set of hash components. Examples of some hashing schemes to compute the hash value or the mapping function integer output includes: (1) exclusive-ORing (XOR) the ASCII or Unicode values of the characters in an object's entire name; (2) simple sum of ASCII or Unicode values of the characters in an object's entire name; or (3) a bit-shifted XOR scheme in which six-bits in an ASCII (or Unicode) value of the last (or the first) letter/symbol of an object's name are rotated (left or right, as selected) first and the rotated output is XORed with the bits in the ASCII (or Unicode) value of the next immediate character in the object's name.

The original, non-hash directory object 30 is deleted (block 38, FIG. 5) after entries from the original directory object 30 (FIG. 4) are placed into corresponding hash components (FIG. 6). Because each hash component object 42–46 contains an indication as to the total number of hash components contained in the hash master (this number is five in the embodiment shown in FIG. 6), the reconstruction of the master object 40 is simplified in the event of loss of the hash master 40. The master 40 may be reconstructed listing the correct children (i.e., hash components) in the correct order using the information contained in the children.

When a file manager receives a client's request for an access to an object that is part of a hash directory (i.e., stored in a hash component) or a client's request to create a new entry in the hash directory, the file manager first validates the client's access. In order to perform an access check (i.e., whether the client is requesting access to the correct hash component), the file manager-1 checks its cached copy of the ACL in the hash master 40 to verify that the file manager-1 is the file manager authorized to grant operations on the requested hash component. If the access is permitted in the ACL, then the file manager-1 handles client's request as a routine request for information transfer operation. If the access is not permitted, then the file manager-1 returns an error code to the client so indicating. However, if the ACL from the hash master 40 is not already cached in the file manager-1, the file manager-1 first contacts the file manager (e.g., the file manager-9) responsible for the hash master 40 to obtain a capability to access the hash master object 40. Thereafter, the file manager-1 reads and parses the hash master object 40 to obtain and cache its ACL. If an access requested by a client involves a file name, then the file manager-1 may compute the hash of the file name (using one of the hashing algorithms or mapping functions described hereinabove) to verify that the client is indeed acting upon the correct hash component. If it is not, then the file manager-1 returns an error code so indicating.

In any event, using the pre-defined hashing algorithm or mapping function, clients can either directly or through corresponding file managers (depending on the nature of the operation) determine in which hash component objects the required files/objects are located. In one embodiment, to determine which component object to access for a specific file/object, the client (or the corresponding file manager, as the case may be) applies the hashing algorithm or the mapping function to a unique portion of the file path name for the hashed file/directory object. Thereafter, clients or file managers access the corresponding hash components—with only one client or file manager writing a hash component at a time—to perform the information transfer operations on the desired objects (block 39, FIG. 5). Thus, the problem of access contentions because of simultaneous and concurrent access requests on a single object is substantially alleviated.

It is noted that when a file manager caches the ACL in the hash master 40, it registers with the file manager responsible for the hash master 40 the fact that it has cached the hash master's attributes. When the hash master's object attributes change (such as, for example, when the ACL changes), the file manager for the hash master object synchronously notifies file managers caching these attributes to allow them to update their cached content.

To achieve generation of a hash directory object, one or more file managers 14 in the system 10, who frequently experience concurrency problems, may be configured to convert a regular directory object into a corresponding hash directory when instructed by a performance manager 22. In one embodiment, the client 24, 26 may be provided with appropriate program code and information about hashing algorithm in use in the system 10 so as to enable the client to determine which hash component object needs to be accessed to perform an information transfer operation on an object stored therein. In this situation, the client applies the mapping function (or hashing algorithm) on the entire name of the object to be accessed to determine the appropriate hash component where the object can be found.

In one embodiment, when it is experienced that the selected hash algorithm or mapping function does not properly balance objects over the number of hash components created, then the number of future hash components (for hash directories created in future) may be modified or changed to alleviate the problem of uneven distribution of objects among the hash components. It is preferable not to modify the hash function/algorithm and the associated hash components for an existing hash directory. However, in one embodiment, each bash directory may have a different hash algorithm and a different number of hash components associated with it.

It is noted that various managers (e.g., file managers 14, storage managers 16, etc.) shown and described with reference to FIG. 1, the program code implemented to operate the system in FIG. 1, and the program code for performing the directory hashing according to an embodiment of the present invention may reside on a computer-readable, tangible storage medium (e.g., a compact disc, an optical disc, a magnetic storage medium such as a computer hard drive, etc.) allowing ease of software portability and system management. The program code on the storage medium can be executed by a computer system and upon execution, the program code performs various operations described hereinabove with reference to individual components constituting the program code. Similarly, a client application (e.g., any of the client applications 24, 26 in FIG. 1) can also be stored on a computer-readable data storage medium and executed therefrom.

The foregoing describes a data storage methodology wherein a hashing algorithm is applied to break a directory object experiencing frequent concurrent accesses from a number of client or manager applications into a predetermined number of hash component objects and a hash master object that manages the component objects. The hash master object and the hash components, together, constitute a hash directory, which replaces the original non-hashed directory object. Each hash component object contains a portion of the entries contained in the original directory object. The hash master object is an index object that contains a list of component-object_ID's identifying each individual hash component object and points to each such hash component. Each hash component is managed by only one file manager. Thus, the work of managing entries in the hash directory with N (N>1) component objects and one hash master (i.e., a total of (N+1) objects) is balanced across up to M (1≦M≦(N+1)) file managers, each of which may act independently of the other file managers. The hash master itself could be managed by a separate file manager. The entries in the original directory object are distributed among the hash component objects using a predefined hashing algorithm or mapping function. A client application may also use the mapping function to determine which hash component the client needs to access for a specific object file or subdirectory. Thus, the prior art problems of access serialization and reduced data access manageability are substantially alleviated.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of providing increased concurrency among information transfer operations performed by one or more of a plurality of executable applications operating in an object-based data storage system, said method comprising:

forming an index object that points to a plurality of component objects, wherein said index object is concurrently accessed by one or more of said plurality of executable applications, wherein each component object contains a portion of information managed by said index object, and wherein forming said index object includes:

identifying a directory object in said data storage system that requires said increased concurrency among said information transfer operations performed thereon, wherein a content of said directory object constitutes a first plurality of entries, dividing said content of said directory object into said plurality of component objects, wherein said first plurality of entries is divided among said plurality of component objects with each component object storing a respective non-overlapping portion of said first plurality of entries, and creating said index object containing a second plurality of entries, wherein each of said second plurality of entries points to a different one of said plurality of component objects and identifies said component object pointed to;

using a mapping function per-access basis to determine which of said plurality of component objects is to be accessed by a corresponding one of said plurality of executable applications; and configuring each of said plurality of executable applications to access on per-access basis only that component object which is determined using said mapping function for respective information transfer operations;

wherein each file manager in said data storage system manages a portion of said information transfer operations on a corresponding component object without coordination with other file managers in said data storage system during each access to said index object.

2. The method of claim 1, further comprising deleting said directory object.

3. The method of claim 1, wherein identification of said directory object is performed at one or more of the following instances:

when said directory object is created;

when said directory object attains a predetermined size; and when the number of said information transfer operations pending to be performed on said directory object exceeds a predetermined value.

4. The method of claim 1, wherein each of said first plurality of entries is uniquely
identifiable in said object-based data storage system.

5. The method of claim 1, wherein identifying said directory object includes allowing one of said plurality of executable applications to identify said directory object.

6. The method of claim 1, wherein said first plurality of entries is divided among said plurality of component objects using said mapping function.

7. A method of providing increased concurrency among information transfer operations performed by one or more of a plurality of executable applications operating in an object-based data storage system, said method comprising:
   forming an index object that points to a plurality of component objects, wherein said index object is concurrently accessed by one or more of said plurality of executable applications, wherein each component object contains a portion of information managed by said index object, and wherein forming said index object includes:
      identifying a directory object in said data storage system that requires said increased concurrency among said information transfer operations performed thereon, wherein a content of said directory object constitutes a first plurality of entries,
      dividing said content of said directory object into said plurality of component objects, wherein said first plurality of entries is divided among said plurality of component objects with each component object storing a respective non-overlapping portion of said first plurality of entries, and
      creating said index object containing a second plurality of entries, wherein each of said second plurality of entries points to a different one of said plurality of component objects and identifies said component object pointed to;
   using a mapping function per-access basis to determine which of said plurality of component objects is to be accessed by a corresponding one of said plurality of executable applications; and
   configuring each of said plurality of executable applications to access on per-access basis only that component object which is determined using said mapping function for respective information transfer operations;
   wherein an object corresponding to one of said first plurality of entries contains the following attribute values;
   a first attribute value identifying an entity in said data storage system responsible for storing said object;
   a second attribute value identifying an object group containing said object; and
   a third attribute value identifying said object.

8. A method of providing increased concurrency among information transfer operations performed by one or more of a plurality of executable applications operating in an object-based data storage system, said method comprising:
   forming an index object that points to a plurality of component objects, wherein said index object is concurrently accessed by one or more of said plurality of executable applications, wherein each component object contains a portion of information managed by said index object, and wherein forming said index object includes:
      identifying a directory object in said data storage system that requires said increased concurrency among said information transfer operations performed thereon, wherein a content of said directory object constitutes a first plurality of entries,
      dividing said content of said directory object into said plurality of component objects, wherein said first plurality of entries is divided among said plurality of component objects with each component object storing a respective non-overlapping portion of said first plurality of entries, and
      creating said index object containing a second plurality of entries, wherein each of said second plurality of entries points to a different one of said plurality of component objects and identifies said component object pointed to;
   using a mapping function per-access basis to determine which of said plurality of component objects is to be accessed by a corresponding one of said plurality of executable applications; and
   configuring each of said plurality of executable applications to access on per-access basis only that component object which is determined using said mapping function for respective information transfer operations;
   wherein dividing said content of said directory object includes:
      assigning a numerical identifier to each of said plurality of component objects;
      identifying a unique portion of a file path name for each corresponding object in said first plurality of entries;
      applying said mapping function to each said unique portion, thereby generating a corresponding integer value for each said unique portion;
      computing a modulus of each said corresponding integer value over the total number of said component objects in said plurality of component objects, thereby generating a corresponding storage integer whose value is less than or equal to said total number; and
      storing each of said first plurality of entries into that one of said plurality of component objects whose numerical identifier is equal to said corresponding storage integer for said entry to be stored.

9. A method of providing increased concurrency among information transfer operations performed by one or more of a plurality of executable applications operating in an object-based data storage system, said method comprising:
   forming an index object that points to a plurality of component objects, wherein said index object is concurrently accessed by one or more of said plurality of executable applications, wherein each component object contains a portion of information managed by said index object, and wherein forming said index object includes:
      identifying a directory object in said data storage system that requires said increased concurrency among said information transfer operations performed thereon, wherein a content of said directory object constitutes a first plurality of entries,
      dividing said content of said directory object into said plurality of component objects, wherein said first plurality of entries is divided among said plurality of component objects with each component object storing a respective non-overlapping portion of said first plurality of entries, and
      creating said index object containing a second plurality of entries, wherein each of said second plurality of entries points to a different one of said plurality of component objects and identifies said component object pointed to;

using a mapping function per-access basis to determine which of said plurality of component objects is to be accessed by a corresponding one of said plurality of executable applications; and configuring each of said plurality of executable applications to access on per-access basis only that component object which is determined using said mapping function for respective information transfer operations;

wherein each of said plurality of component objects includes at least one of the following:

an indication distinguishing said component object from said index object;

a first information identifying said mapping function;

a second information identifying a number assigned to said component object; and a third information identifying the total number of component objects in said plurality of component objects.

10. A method of providing increased concurrency among information transfer operations performed by one or more of a plurality of executable applications operating in an object-based data storage system, said method comprising:

forming an index object that points to a plurality of component objects, wherein said index object is concurrently accessed by one or more of said plurality of executable applications, wherein each component object contains a portion of information managed by said index object, and wherein forming said index object includes:

identifying a directory object in said data storage system that requires said increased concurrency among said information transfer operations performed thereon, wherein a content of said directory object constitutes a first plurality of entries, dividing said content of said directory object into said plurality of component objects, wherein said first plurality of entries is divided among said plurality of component objects with each component object storing a respective non-overlapping portion of said first plurality of entries, and creating said index object containing a second plurality of entries, wherein each of said second plurality of entries points to a different one of said plurality of component objects and identifies said component object pointed to;

using a mapping function per-access basis to determine which of said plurality of component objects is to be accessed by a corresponding one of said plurality of executable applications; and configuring each of said plurality of executable applications to access on per-access basis only that component object which is determined using said mapping function for respective information transfer operations;

wherein said index object includes at least one of the following:

an indication distinguishing said index object from each of said plurality of component objects;

a first information identifying the total number of component objects in said plurality of component objects;

a second information identifying an encoding scheme for said mapping function; and an access control list (ACL) identifying a group of principals in said data storage system authorized to access said plurality of component objects through said index object.

11. A computer-readable storage medium containing a program code, which, upon execution by a processor in an object-based distributed data storage system, causes said processor to perform the following:

form an index object that points to a plurality of component objects, wherein said index object is configured to be concurrently read by one or more of a plurality of executable applications operating in said data storage system, and wherein each component object contains a portion of information managed by said index object;

use a mapping function to determine which of said plurality of component objects is to be accessed by a corresponding one of said plurality of executable applications; and configure each of said plurality of executable applications to access only that component object which is determined using said mapping function;

configure each file manager in said data storage system to manage a portion of information transfer operations on a corresponding component object without coordination with other file managers in said data storage system during each access to said index object.

12. An object-based data storage system providing increased concurrency among information transfer operations performed by one or more of a plurality of executable applications operating in said data storage system, said data storage system comprising:

means for forming an index object that points to a plurality of component objects, wherein said index object is concurrently read by one or more of said plurality of executable applications, and wherein each component object contains a portion of information managed by said index object;

means for using a mapping function to determine which of said plurality of component objects is to be accessed by a corresponding one of said plurality of executable applications; and means for configuring each of said plurality of executable applications to access only that component object which is determined using said mapping function for respective information transfer operations;

means for configuring each file manager in said data storage system to manage a portion of information transfer operations on a corresponding component object without coordination with other file managers in said data storage system during each access to said index object.

* * * * *